Feb. 7, 1956 G. C. KNIGHT 2,733,543
TOY STEERING WHEEL
Filed Oct. 19, 1953 2 Sheets-Sheet 1

INVENTOR.
GEORGE C. KNIGHT
BY
*Alfred E. Wilson*
ATTORNEY.

Feb. 7, 1956   G. C. KNIGHT   2,733,543
TOY STEERING WHEEL
Filed Oct. 19, 1953   2 Sheets-Sheet 2

INVENTOR.
GEORGE C. KNIGHT
BY
ATTORNEY.

United States Patent Office 2,733,543
Patented Feb. 7, 1956

2,733,543

TOY STEERING WHEEL

George C. Knight, Detroit, Mich., assignor to George C. Knight Company, Detroit, Mich., a corporation of Michigan Application October 19, 1953, Serial No. 386,751

5 Claims. (Cl. 46—1)

This invention relates to an educational and amusement device wherein a child's seat having controls closely simulating the driving controls of an automobile is adapted to be secured to an automobile or other seat back.

Complications in the operation of motor vehicles frequently result when small children are among the passengers. These complications are materially enhanced where a single adult who drives the vehicle must travel with a small child, the child diverting the driver's attention from the necessary functions which must be performed in the normal operation of the vehicle.

To protect the child, and prevent the driver's attention from being diverted to an undesirable extent, a child's educational and amusement device in the form of an auxiliary seat adapted to be positioned adjacent the driver of a vehicle is employed. These devices are adapted to be firmly secured in place adjacent the driver, and frequently have a safety belt or other harness whereby the child may be firmly secured in place. Controls which simulate the driving controls of a motor vehicle are employed and are positioned in the same position relative to the child as the controls of the vehicle are positioned relative to the driver.

An object of my invention resides in the provision of realistic controls in the form of direction signals and selector lever indicating lights for use on educational and amusement devices of the type under consideration.

Another object of the invention is to provide a manually actuated illuminated direction signal which can be economically fabricated for use on a child's auxiliary seat.

A further object of the invention resides in the provision of illumination of an indicator associated with a selector lever to indicate the position of the selector lever in a manner simulating that employed in connection with the controls of a motor vehicle.

Yet another object of my invention is to provide an illuminated direction signal adapted to be used in association with a child's auxiliary seat of any type to enhance the realistic appearance and operation of such devices to retain a child's interest over a longer period of time.

Still a further object of this invention is to increase the amusement and educational values of a device of this type by more closely simulating the controls of a motor vehicle.

Other objects and advantages of this invention will be apparent from the following description, considered in conjunction with the accompanying drawings submitted for purposes of illustration only and not intended to define the scope of the invention, reference being had for that purpose to the following claims.

In the drawings wherein similar reference characters refer to similar parts throughout the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
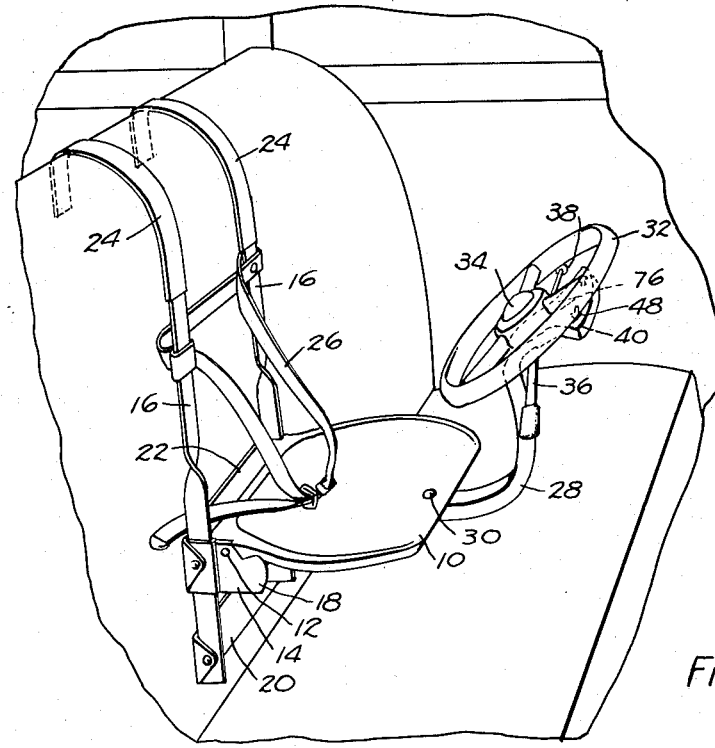
Fig. 1 is a perspective view of a device embodying my invention.

Referring now more particularly to Fig. 1, it will be noted that a seat 10 preferably of the so-called bucket type is hingedly mounted on spaced bolts 12 positioned in spaced brackets 14 secured to spaced vertically extending straps 16. The brackets 14 have sections 18 extending forwardly of the bolts 12 to engage the side sections of the seat 10 to limit angular movement of the seat 10. Vertically spaced braces 20 and 22 extend between the vertically extending straps 16 to tie the members together and provide a sturdy and rigid construction. The upper ends of the straps 16 are reversely bent to extend over and engage the upper portion of the back of the seat of a motor vehicle or other seat. The straps 16 may be sheathed with protective material 24 in the form of rubber, fabric, plastic, or other suitable material. A safety belt or other harness 26 may be secured to the vertical straps 16.

The forward mid-section of the seat 10 receives a support 28, preferably of channel section to provide a lightweight strong structure. The support 28 may be secured to the seat in any desired manner as by bolts 30. The upper end of the support 28 is provided with controls to simulate the controls of an automobile, and including a steering wheel 32 having a centrally disposed horn button 34 and a selector lever 36.

In order to make the educational and amusement device more realistic I have provided a simulated directional signal having a manually operable lever 38 and a dial segment 40 formed of any suitable metal or plastic material which has a front face and a rear closure member 41. The dial segment and the rear closure members 40 and 41 have overlapping flanges 42 and 43. The box-like structure thus formed is secured to the upper end of the channel shaped support 28 by projections 44. Spaced arrow shaped apertures 46 and 48 which if desired may be fitted with plastic inserts to provide interesting light diffusion to add to the realism of the device.

Figure 2:
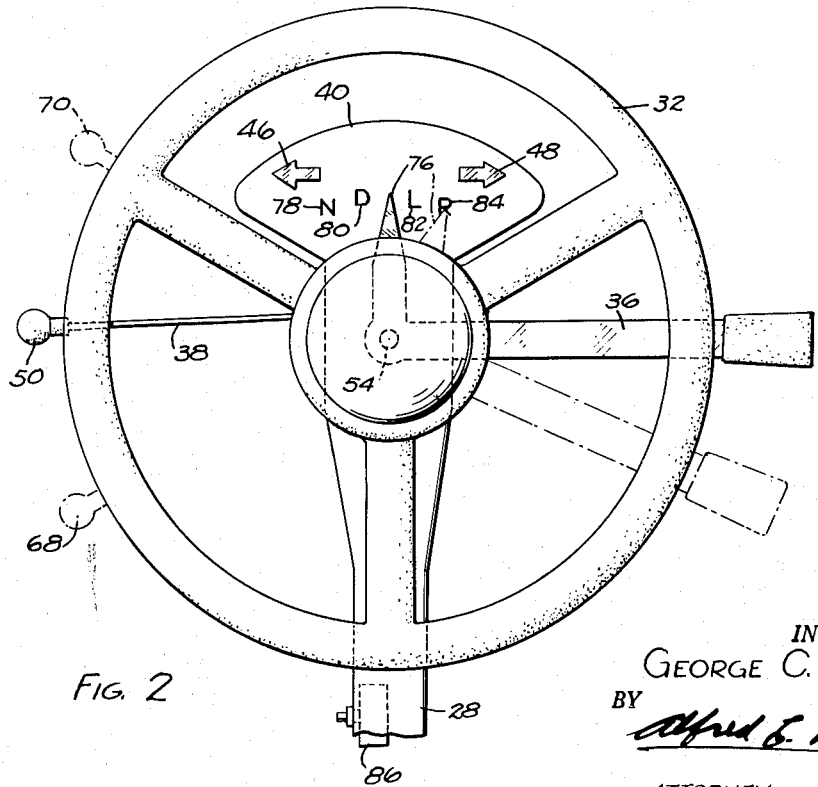
Fig. 2 is a fragmentary front view of the steering wheel portion illustrating my invention.
Figure 3:
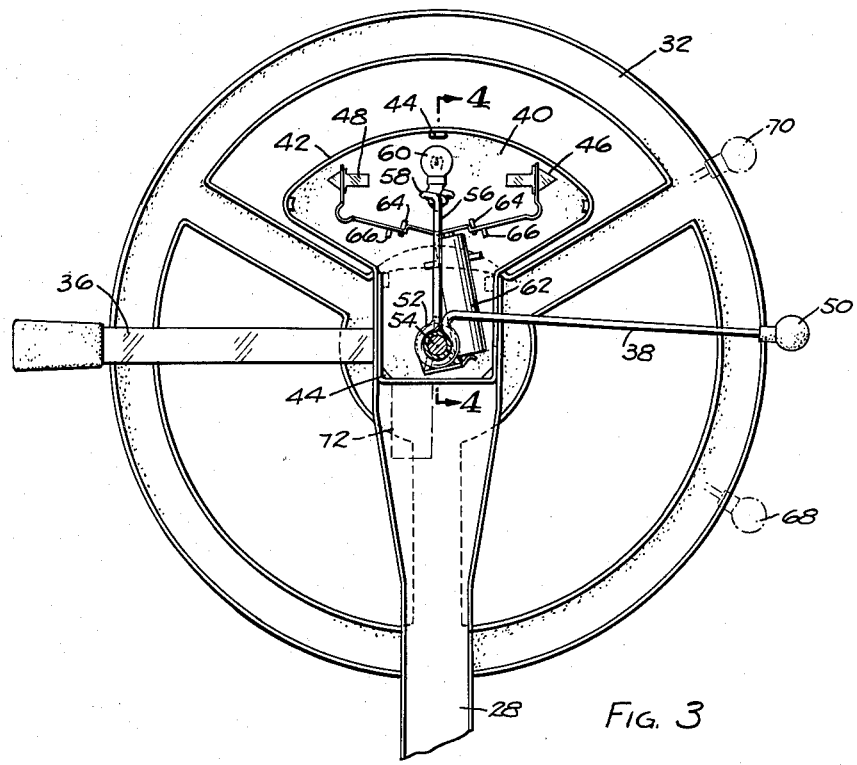
Fig. 3 is a fragmentary view of the back of the steering wheel portion illustrated in Fig. 2.
Figure 4:
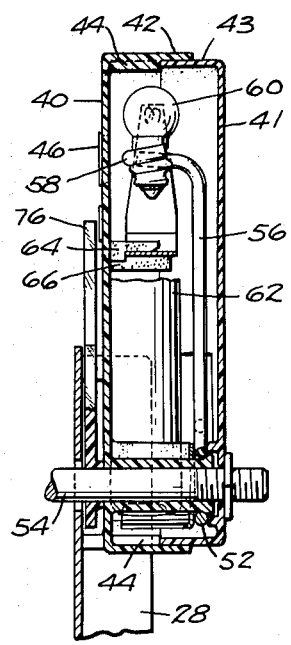
Fig. 4 is a sectional view taken substantially on the line 4—4 of Fig. 3, looking in the direction of the arrows.

To provide a construction that is economical to fabricate the lever 38 may be provided wtih a knob 50 at one end and may be bent as illustrated at 52 to partially surround and be pivoted on a stud 54 secured in the top of the support 28. The free end 56 of the lever 38 is looped at 58 to receive a small size electric bulb 60 such as would be used in a small flashlight. A small battery 62 adapted to be positioned in a carrier and to have its opposite ends engage clips 64 and 66 is employed to illuminate the bulb 60 when the lever 38 is moved in opposite directions from a neutral position to the positions 68 or 70 to align the bulb 60 with one of the apertures 46 or 48 respectively. It will be apparent that when the lever 38 is moved to the position 68 a circuit is completed from the battery 62 to the bulb 60 to illuminate the arrow shaped aperture 46 to indicate a left hand turn when viewed in Fig. 2. Conversely when the lever 38 is moved to the position 70 the bulb 60 is aligned with the aperture 48 and an electric circuit is completed from the battery 62 to the bulb 60 to indicate a right hand turn when viewed in Fig. 2.

If desired a suitable flasher mechanism 72 may be interposed in the circuit to intermittently interrupt the circuit between the battery 62 and the bulb 60 to more closely simulate the operation of the corresponding vehicle control in an automobile.

It will be apparent that modifications of the mechanism for illuminating the apertures 46 and 48 may be employed without departing from the spirit of my invention. For example separate electric bulbs may be positioned in alignment with each of the apertures 46 and 48, and a switch mechanism operably connected to the lever 38 may be employed to energize the light bulb associated with each of the apertures 46 and 48 when the lever 38 is moved to the positions 68 and 70 respectively. It will further be apparent that light may be "piped" or conducted as for example through a Lucite tube to the apertures 46 and 48 of the dial segment 40. If desired a plastic or other transparent or partially transparent dial segment 40 may be employed, whereupon it is unnecessary to employ apertures 46 and 48 therein, but rather the source of light may merely be positioned behind the dial segment to illuminate the dial segment 40 in the areas of the sections 46 and 48. Circuit interrupters or flashers may be employed with any of the illuminating mechanisms for simulating a turn indication. If desired a simple pointer operably connected to the lever 38 may move over the face of a dial segment 40 to indicate a turn to the left or the right depending on whether the lever 38 is moved respectively toward the position 68 to shift the pointer in the direction of the arrow 46, or toward the position 70 to shift the pointer in the direction of the arrow 48 to indicate a right turn.

My invention contemplates the use of a pointer 76 carried by or operable with the selector lever 36. The pointer 76 may be moved in association with the dial segment 40. The dial segment 40 may have a plurality of drive position indications such for example as N, D, L and R identified by the numerals 78, 80, 82 and 84 respectively to indicate that the selector lever 36 is in a position to simulate positions of neutral, drive, low and reverse. It will be apparent that any desired indications arranged in whatever sequence desired may be employed to simulate the driving controls of a vehicle.

The pointer 76 may be formed for example of Lucite or other plastic material of whatever color desired, and it may be illuminated when desired. For example the pointer 76 may be connected to a suitable source of light energized from the battery 62. It may be controlled in any desired manner, for example to be illuminated when the end of the pointer 76 is aligned with one of the indications N, D, L or R identified herein by the reference numerals 78, 80, 82 or 84 respectively. It will also be apparent that if desired a separate manually operated switch 86 positioned for example on the support 28 may be employed to activate the light associated with the pointer 76. Also it will be apparent that in lieu of illuminating the pointer 76 the dial segment 40 may be illuminated to indicate the position of the drive selector lever 36.

It will also be apparent that a pointer 76 may be used in association with a dial segment 40 without the necessity for illuminating the pointer or the drive position segments thereof if an extremely economical unit is desired.

My device may be used wherever desired and is not limited to use adjacent the driver's compartment of a motor vehicle. For example it may be used in the rear seat of a vehicle or may be positioned on the back of any chair or other article of furniture in the home or elsewhere to amuse children and keep them quiet.

I claim:

1. A toy steering wheel and simulated controls which comprises a supporting column adapted to be secured to a seat, a steering wheel on said column, a direction signal associated with the steering wheel, a signal actuating lever associated with the steering wheel and movable in opposite directions from a neutral position to indicate left and right hand turns respectively, a dial segment positioned behind and adjacent the steering wheel, and direction indicating means actuated by the direction signal indicator actuating lever.

2. The invention defined in claim 1 wherein spaced illuminated means are lighted when the direction signal actuating lever is moved in opposite directions from a neutral position to indicate a turn.

3. The invention defined in claim 2 wherein spaced direction indicating apertures are formed in the dial segment, and an electric light adapted to selectively align with one of said spaced apertures and be illuminated when the direction signal actuating lever is moved in opposite directions from a neutral position to indicate a turn.

4. The invention defined in claim 3 wherein the light is intermittently interrupted when the direction signal actuating lever is positioned to indicate a turn.

5. The invention defined in claim 1 wherein the dial segment is provided with spaced oppositely directed arrow shaped apertures provided with colored transparent material adapted to be selectively lighted when the actuating lever is moved in opposite directions from a neutral position.

References Cited in the file of this patent

UNITED STATES PATENTS

| | | |
|---|---|---|
| D. 167,287 | Smith | July 15, 1952 |
| 2,322,403 | Van Der Kieft | June 22, 1943 |
| 2,522,205 | Anderson | Sept. 12, 1950 |
| 2,662,341 | Solomon | Dec. 15, 1953 |